United States Patent [19]

Blaschke et al.

[11] Patent Number: 4,577,299
[45] Date of Patent: Mar. 18, 1986

[54] ACOUSTIC DIRECTION FINDER

[75] Inventors: Hans P. Blaschke, Steinhöring; Winfried Knappik, Planegg; Horst Mette, Oberndorf; Peter Scholler, Ottobrunn, all of Fed. Rep. of Germany

[73] Assignee: Messerschmitt-Bölkow-Blohm GmbH, Fed. Rep. of Germany

[21] Appl. No.: 497,201

[22] Filed: May 23, 1983

[30] Foreign Application Priority Data

May 28, 1982 [DE] Fed. Rep. of Germany ....... 3220175

[51] Int. Cl.⁴ .............................................. G01S 3/80
[52] U.S. Cl. .................................... 367/120; 367/125
[58] Field of Search ............... 367/100, 104, 120, 125; 343/378

[56] References Cited

U.S. PATENT DOCUMENTS 3,838,593 10/1974 Thompson ...................... 367/120 X
3,870,989 3/1975 Mallet ............................ 367/125 X
4,236,159 11/1980 Alpers ................................. 343/378
4,425,634 1/1984 Iino et al. ............................ 367/120

FOREIGN PATENT DOCUMENTS 2131786 6/1977 Fed. Rep. of Germany .

Primary Examiner—Richard A. Farley
Attorney, Agent, or Firm—McGlew and Tuttle

[57] ABSTRACT

An acoustic direction finding method utilizes correlation between the signals of plural sound pickups on a rotating base. As the base rotates the pickups receive signals from a source of sound which is the target for which direction information is to be obtained, these signals are shifted in time from one pickup to the next. The base is rotated substantially at constant speed with one full rotation being divided into a plurality of angle sections. The pickup signals are correlated in the individual succeeding angle sections, thus obtaining a correlation function with a correlation peak corresponding to the target direction for each angle section. The correlation functions of the same angle section are added to each other with successive rotations of the base. A curve generated by the correlation peaks is then smoothed and utilized to determine the direction of the target. To sense the rotation of the base, a coil is utilized which is fixed to the base and rotates in the magnetic field of the Earth to generate a rotation signal. The frequency of the rotation signal which equals that of the base is multiplied by a multiplier and utilized as a control clock pulse to divide each rotation of the base into the plural angle sectors.

8 Claims, 1 Drawing Figure

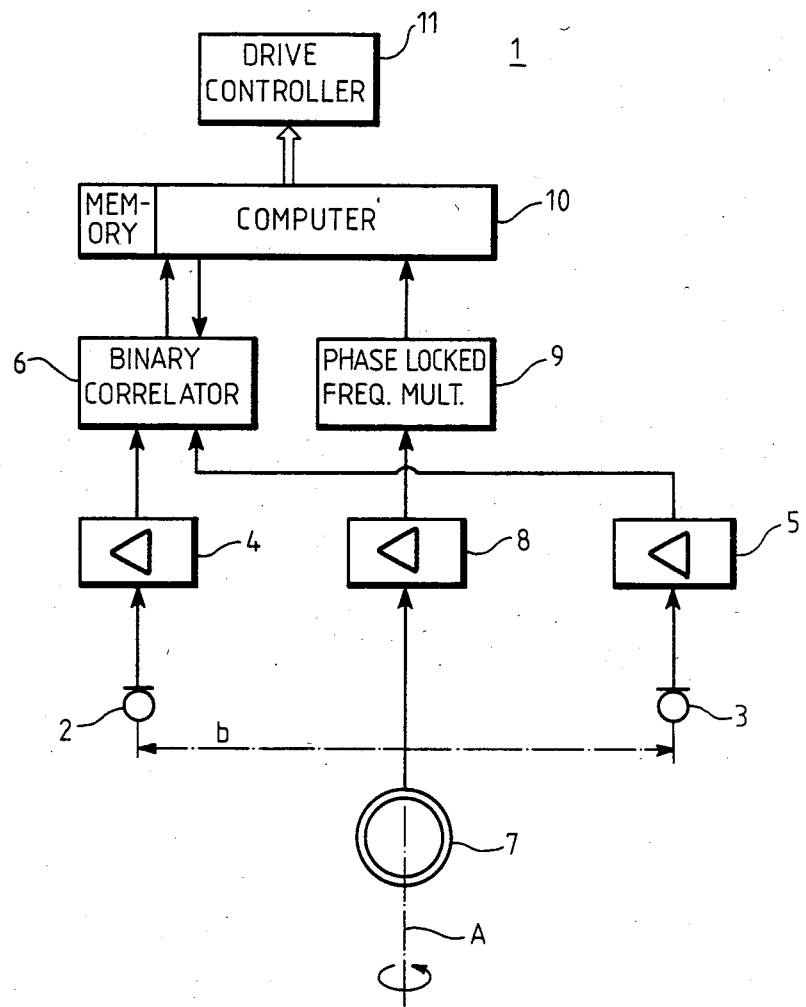

ACOUSTIC DIRECTION FINDER

FIELD AND BACKGROUND OF THE INVENTION

The present invention relates in general to direction finders and in particular to a new and useful acoustic correlation direction finder which utilizes a rotating base having a plurality of sound pickups which generate a plurality of signal including portions caused by sound from a target, which signals are correlated and otherwise processed to determine the direction of the target.

In acoustic correlation direction finding, acoustic signals coming from a target are received by a direction finding base, e.g. having two microphones or having four microphones arranged in the corners of a tetrahedron. In the correlation, acoustic signals which do not originate from a signal source but are distributed at random, such as background noise like rain, wind or the like, are averaged out, whereas the signals originating from a localizable signal source are summed by integration over time, so that there appear in the correlation function correlation peaks singularly correlated with these signal sources. The correlation peaks indicate the value of the time shifts at which the signals impinging on the microphones from the signal source are received. From this time shift the direction of the signal source relative to the microphone arrangement is determined. Additional details can be found in U.S. Pat. No. 4,236,159.

Acoustic correlation direction finders are used when acoustic signal sources are to be localized, as for instance in the military sector for the localization of armored vehicles (tanks).

Tanks are attacked, among other ways with so-called drop ammunition from the air. Such ammunition is ejected from an airplane or from an ammunition receptacle and then drops slowly, e.g. at first attached to a parachute and then braked by the air, to the ground, generally rotating about a vertical axis for stabilization. The drop ammunition has a search head, as well as control drives addressed by the search head signals, which drives will, after a target has been acquired, displace the drop ammunition transversely in the direction of the target. It would be desirable if the target search head could be equipped with an acoustic correlation direction finder, because, compared with electromagnetic direction finders as used otherwise, e.g. radar or "ladar" equipment, it is of less complicated construction and is cheaper as well.

In acoustic correlation direction finding with a rotating direction finding base, however, a problem arises. On the one hand, the correlation time must be very short, so that during that time the position of the direction finding base relative to the direction of sound impingement will change little. On the other hand, however, with shorter correlation time also, the signal processing yield and hence also the direction finding range decreases.

SUMMARY OF THE INVENTION

An object of the present invention is to develop a method and an arrangement for acoustic correlation direction finding of the kind in question, in such a way that even with the direction finding base rotating, the signal processing yield is high.

Accordingly, another object of the invention is to provide a method of direction findung utilizing acoustic correlation wherein acoustic signals originating from a signal source (sounds from a target) are received by a plurality of pickups of a rotating finder base with each pickup generating a signal that is shifted in time with respect to the signal of another pickup. The base is rotated at substantially constant speed and the pickup signals are correlated in successive angle sections corresponding to a certain partial angular rotation of the base. The thus obtained correlation functions with their correlation peaks whose positions correspond with the direction of the signal source, are stored in a memory. The correlation functions with their peaks are weighted with a decay factor, and the correlation functions occurring in same individual angular sections are added together. The curve for the correlation peaks in succeeding angular sections is smoothed and utilized to determine the direction of a signal source or target.

Another subject of the invention is to provide such a method wherein a rotation detector is provided for generating a rotation signal and a multiplier is associated with the rotation detector to multiply the rotation signal. The rotation signal is at the same frequency as the rotation of the base and the multiplier is utilized to divide the rotation of the base into the angle sectors. The multiplier thus provides clock pulses for the signal processing in determining the direcktion.

According to these features, the circumferential angle of the rotating direction finding base is divided into separate rotational angle sections. This subdivision is derived as to time from the rotation frequency of the direction finding base. The rotational position, important for space direction stability of the subdivision, and the rotation frequency are supplied by a rotational position sensor. The correlation functions measured within the individual angle sections, with their correlaction peaks corresponding to direction of the target, are stored in memory and weighted with a time factor which establishes a certain decay time for the correlation function. The correlation functions of equal angle sections are added up at successive rotations of the direction finding base. In order to increase the signal processing yield by re-integration, the time curve of the correlation peaks is moreover smoothed during the rotation of the direction finding base. At constant rotation of the direction finding base, the time curve of the correlation peak is a sine curve. Due to the smoothing and based on the exact knowledge of the rotation frequency of the direction finding base, the expected position of the correlation peak can be predicted very accurately. Due to this synchronization and control of all measurements and evaluations with the rotation frequency, the signal processing yield and hence also the direction finding range are very great, so that despite the rotating direction finding base unambiguous direction values for the signal source are determined.

For the measurement of the rotational position and of the rotation frequency of the direction finding base, the Earth's magnetic field can be utilized in a simple manner. A magnetic field sensor, in the simplest case a coil, furnishes, when the coil axis is perpendicular to the axis of rotation of the direction finding base, because of its rotation in the Earth's magnetic field, a sinusoidal voltage whose frequency is identical with the rotation frequency of the direction finding base. This occurs at any location on the Earth, as long as the axis of rotation of the magnetic field sensor does not coincide exactly with the magnetic field direction in space. The sinusoidal output voltage of the magnetic field sensor is multiplied in its frequency by means of a phase locked frequency multiplier. With the aid of this frequency multiplied signal, the circumferential angle of the rotating direction finding base is divided into separate space direction stable angle sections. Also, the synchronized correlation evalution is carried out with this frequency multiplied signal.

A correlation direction finder consists of an acoustic direction finding base with two microphones, the signals of which are analog processed, and of a correlator, preferably a binary correlator, to which the signals are supplied. Further it includes a sensor for measuring magnetic flux changes which furnishes a sine signal corresponding to the rotational position and to the rotation frequency of the direction finding base and, after further processing in a phase-locked frequency multiplier stage, a control signal for the division of the circumferential angle of the direction finding base into separate space direction stable angle sections as well as for the control of the evaluating process. Lastly, the invention includes a microcomputer or microprocessor in which the correlation functions are stored, multiplied by a decay factor and added up. In the microcomputer further the sinusoidal curve of the correlation peak position is smoothed. The frequency multiplication signal derived from the rotation frequency controls the microcomputer, which accordingly reads the binary correlator and starts anew, stores, weights and adds the correlation functions, and furthermore continuously determines the direction relative to the signal source from the smoothed sine curve of the correlation peak position. If the direction finding base consists of two microphones, then as the smoothed sine curve passes through zero the target direction is perpendicular to the direction finding base. From the maximum amplitude of this sine curve the angle between the axis of rotation of the direction finding base and the target direction is derived. If the correlation direction finder is used in a rotating drop ammunition, the microcomputer will control also the measures to be taken for target fighting.

A correlation direction finder according to the invention is suitable in particular for use in target searching ammunition for fighting targets which emit acoustic signals, if the ammunition spins about its axis in a fairly stable manner, falls relatively slowly, and is driven intermittently.

Another object of the invention is to provide an apparatus for acoustic direction finding using correlation which utilizes a coil rotating with the base and oriented to generate the rotation signal as the coil rotates in the Earth's magnetic field.

A further object of the invention is to provide such an apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The only FIGURE is a schematic block diagram of a correlation direction finder according to the invention.

DESCRIPTION OF THE PREFERRED EMBODIMENT

Referring to the FIGURE, a correlation direction finder 1 is installed in a drop ammunition (not shown) to be dropped from a carrier aircraft or the like, for attacking armored vehicles. The drop ammunition rotates slowly about a vertical axis A and has a direction finding base b perpendicular to this axis A, with two microphones 2 and 3. During the rotation of the direction finding base about axis A, the two microphones receive an acoustic signal radiated from the target with a time shift varying periodically. At stable rotation and at constant sound impingement direction, the time shift describes a sine, whose frequency is identical with the rotation frequency of the drop ammunition and whose amplitude depends, not only on the microphone spacing b and on the sound velocity, but also on the angle between the axis of rotation A and the direction of sound impingement. The time shift phase is determined by the rotational position of the direction finding base relative to the plane defined by the axis of rotation and the direction of sound impingement. The two microphone signals are preamplified in a signal processing stage 4 and 5, respectively, are frequency band limited, made white, hard limited, subsequently sampled and binary correlated to determine the time shift between the signals in a binary correlator 6. The correlation takes place within small angle sections along the circumferential angle of the rotating direction finding base b, during which the position of the direction finding base to the direction of sound impingement changes but little.

The correlation and subsequent evaluation is clock-controlled, the clock signal being developed from the rotation frequency. To this end there is provided in the drop ammunition a magnetic field sensor, in this case a coil 7, which is mounted in the drop ammunition fixed in a vertical plane and whose diameter lies in the axis of rotation A. If the drop ammunition rotates about the axis A in the direction indicated by the arrow, coil 7 furnishes a sinusoidal output voltage, the frequency of which is identical with the rotation frequency of the drop ammunition. The output voltage is amplified in a signal processing circuit 8 and thereafter supplied to a phase locked frequency multiplier circuit 9. After appropriate signal processing, the output signal of the frequency multiplier circuit 9, is used as clock pulse signal for a microcomputer or computer 10. By this clock signal the size of the individual angle sections is established, within which the microphone signals are binary correlated. The microcomputer controls the binary correlator 6 in the same rhythm and takes over from it the correlation functions determined within the individual angle sections. The correlaction functions with their respective correlation peaks are stored in the microcomputer. The values of the correlation functions are weighted with a time factor. After always exactly one revolution of the direction finding base with the two microphones 2 and 3, the now determined correlation functions of equal rotational sections are added to the stored and weighted correlation functions in the memory of the computer. By this addition the correlation peaks associated with a target are emphasized. The time curce of the correlation peaks during rotation of the drop ammunition describes, at constant rotation frequency, a sine. The time curve of the correlation peak position is subjected to a filtering process and thus smoothed to the expected sine curve. From this smoothed sine curve the target direction is then determined. At each zero passage the target direction is perpendicular to the direction finding base forming by the two microphones. The amplitude of this sine curve is more pronounced, the greater the angle is between the direction of the target and the axis of rotation of the drop ammunition. If the amplitude is zero, the drop ammunition points with the axis of rotation directly to the target. If this is not the case, the microcomputer 10 gives, based on the target direction determination, control signals to a drive control 11 of the drop ammunition. The drop ammunition comprises, e.g. distributed along its circumference, several drive mechanisms, e.g. gas generators, by means of which the drop ammunition can be displaced transversely when controlled accordingly. This takes place until the amplitude of the correlation peak curve has reached zero value.

Naturally the correlation direction finder described can be used also in connection with other applications and not only with a rotating drop ammunition.

While a specific embodiment of the invention has been shown and described in detail to to illustrate the application of the principles of the invention, it will be understood that the invention may be embodied otherwise without departing from such principles.

What is claimed is:

1. An acoustic correlation direction finding device comprising:
    a rotating base having a plurality of sound pickups spaced thereon, each sound pickup operable to generate a base signal responsive to sound from a sound source;
    a rotational position sensor connected to said base for generating a rotation signal having a frequency equal to a rotation frequency of said base;
    multiplier means connected to said rotation position sensor for processing said rotation signal in a phase-locked loop manner to produce clock pulses;
    computer means connected to said multiplier means and controlled by said clock pulses, each two clock pulses defining an angle sector of rotation of said base;
    and a digital correlator means connected to each of said pickups for receiving and correlating the pickup signals and connected to said computer means, said computer means controlling said correlator at a timing set by said clock pulses for generating correlation functions of the pickup signals for each angle sector, and adds together all the correlation functions of each sector for plural rotations of said base, said correlation functions being weighted with a time factor corresponding to a decay time by said computer means, said computer means functional to smooth the curve of the correlation peaks of the correlation functions associated with each angle sector in succeeding angle sectors and operable to determine a direction of the sound source.

2. A device according to claim 1, wherein said rotational position sensor comprising a coil for generating the rotation signal by rotating in the magnetic field of the Earth.

3. A device according to claim 2, wherein said base includes only two pickups each consisting of a microphone.

4. A device according to claim 1, wherein said base includes only two pickups each consisting a microphone.

5. In a method for acoustic correlation direction findng, where acoustic signals originating from a signal source are received by a plurality of pickups of a direction finding base which delivers a plurality of time shifted base signals, one from each pickup, the base signals being correlated with one another to determine the amount of the time shift and hence the direction of impingement of the acoustic signals, the improvement comprising: rotating the direction finding base at a constant speed, generating a rotation signal having a rotation frequency of the base; dividing the rotation signal into regularly successive angle sections each corresponding to a successive angle section of rotation of the base; correlating the base signals in each successive angle section; storing correlation functions thus obtained with their correlation peaks corresponding to the direction of the signal source in a memory; weighting the correlation functions with a decay factor determining a decay time; adding the correlation functions of equal angle sections together; smoothing the curve of the correlation peaks in the succeeding angle sections; and determining the direction of the signal source from this smoothed curve.

6. A method according to claim 5, including adding the correlation functions of individual angle sections only in the region of the correlation peaks.

7. A method according to claim 5, including multiplying the rotation frequency by a number equal to the number of successive angle sectors in one full rotation of the base, in order to divide the rotation signal into the angle section.

8. A method according to claim 7, including digitally correlating and evaluating the direction finding base signals and obtaining clock pulses for the time control of the frequency multiplication of the rotation frequency.

* * * * *